Sept. 3, 1974  F. R. NISSEL  3,833,704
METHOD OF EXTRUDING A PLURAL LAYERED SHEET
Filed June 19, 1972  2 Sheets-Sheet 1
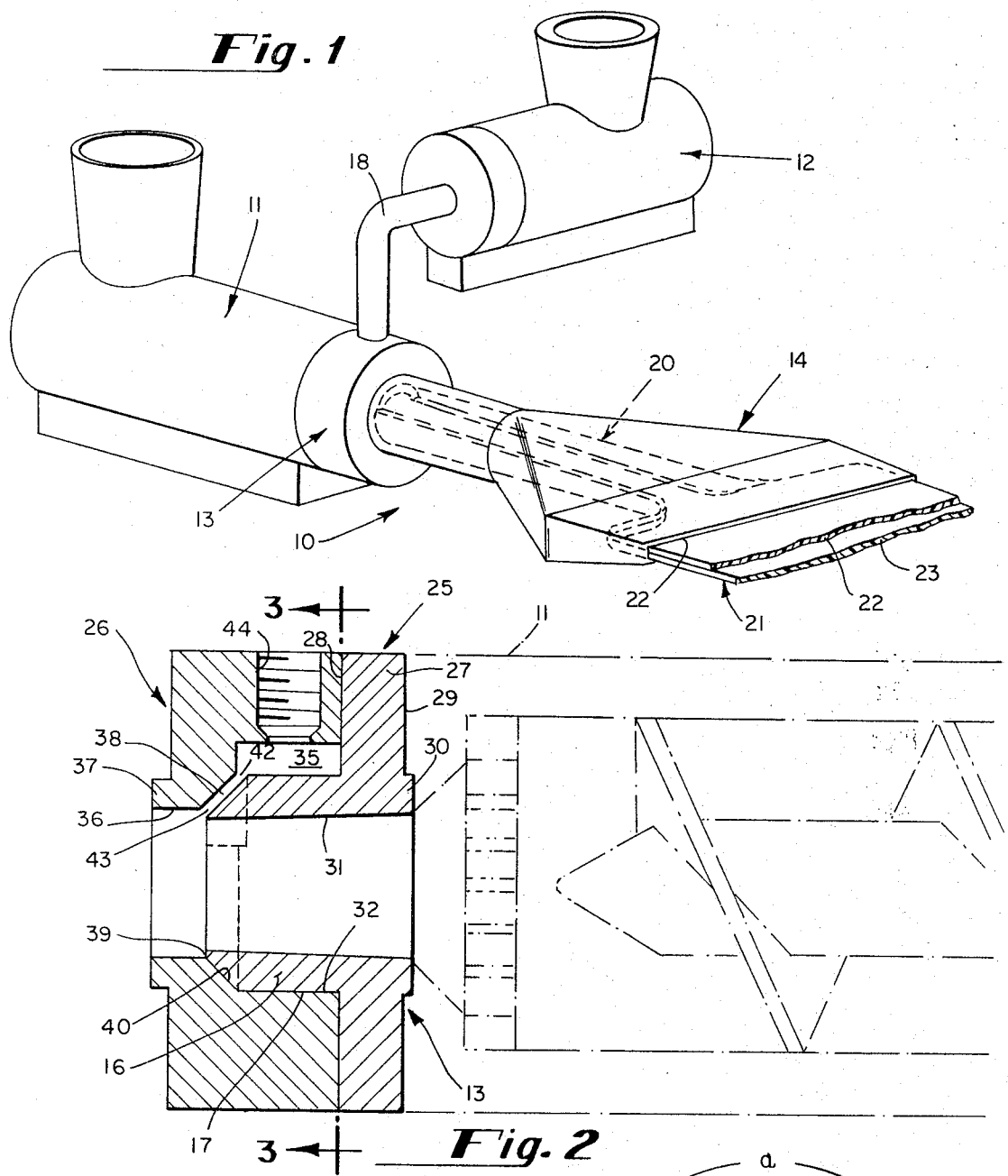
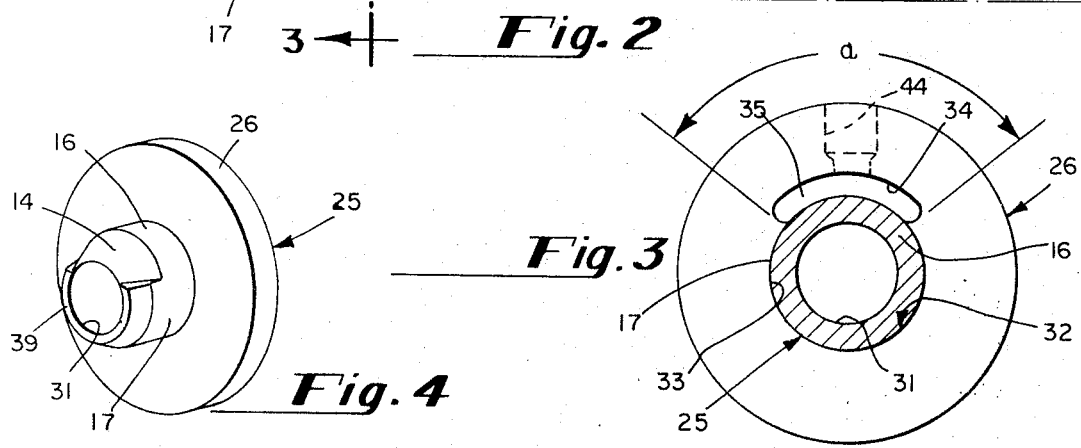

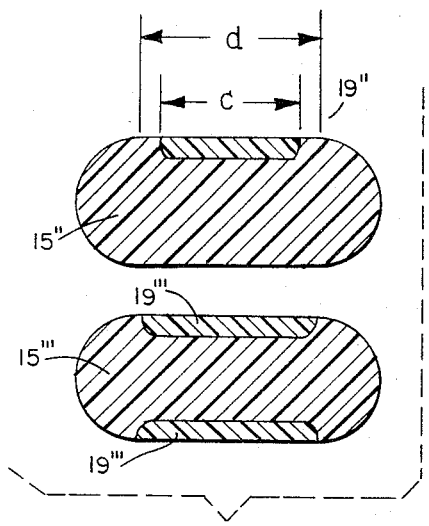
Fig. 8
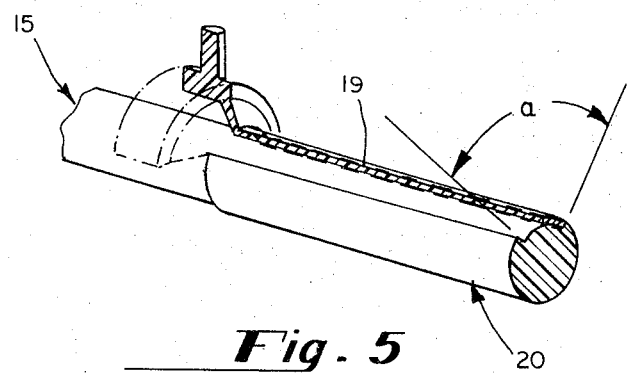
Fig. 5
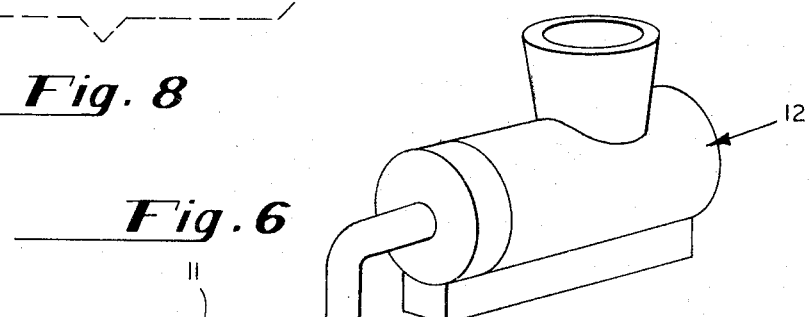
Fig. 6
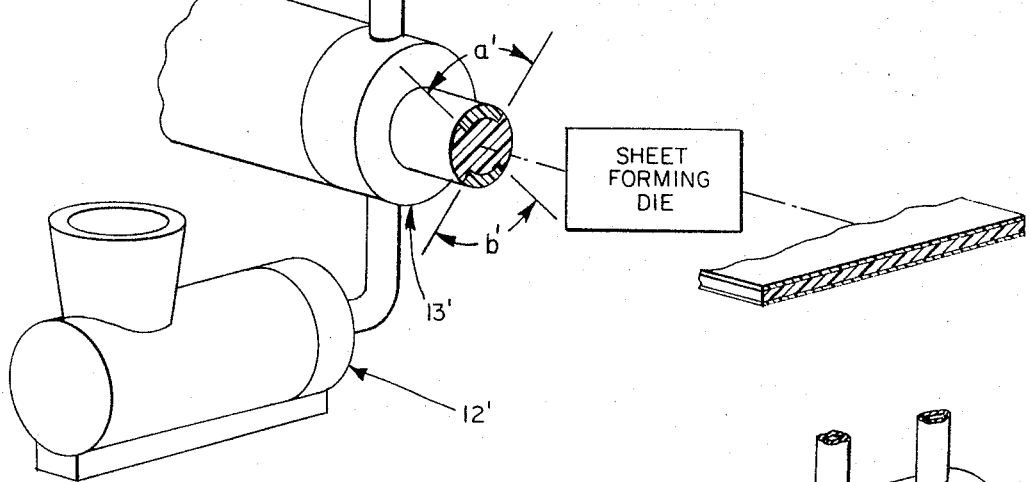
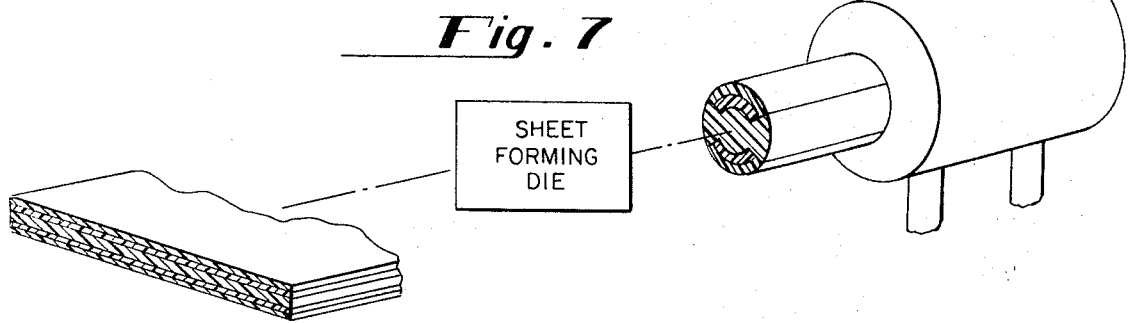
Fig. 7

United States Patent Office 3,833,704
Patented Sept. 3, 1974

3,833,704
METHOD OF EXTRACTING A PLURAL LAYERED SHEET
Frank R. Nissel, Ambler, Pa., assignor to Welex, Inc., King of Prussia, Pa.
Continuation-in-part of abandoned application Ser. No. 118,410, Feb. 24, 1971. This application June 19, 1972, Ser. No. 264,387
Int. Cl. B29f 3/10; B32b 15/08, 31/30
U.S. Cl. 264—171     11 Claims

ABSTRACT OF THE DISCLOSURE

A thermoplastic sheet comprising a lamina bearing base is produced by feeding a heat-plastified laminated rod into a conventional sheet forming die. The laminated rod is formed using an adapter die which is interposed between a rod-forming die and the sheet forming die and which deposits a layer of heat-plastified material constituting the lamina on a segment of the peripheral surface of the cross-section of a heat-plastified rod of the base material, as the rod is extruded from the rod-forming die. The sheet forming die converts the heat-plastified laminated rod into a laminated sheet.

CROSS-REFERENCE TO RELATED APPLICATION

This is a continuation-in-part of my copending application Ser. No. 118,410, filed Feb. 24, 1971, now abandoned.

BACKGROUND OF THE INVENTION

This invention relates to an improved method and means for producing lamina bearing thermoplastic sheets.

The lamina on sheets of the type described cosmetically improve products thermally formed from such sheets as well as give rise to improved performance results. In many products that must resist impact loads, such as cups for vending machines, it is conventional to thermally form the products from sheets of butadiene-styrene, which is a thermoplastic material having high impact strength characteristics. Unfortunately, this material, when extruded in sheet form, has a dull, matte finish which makes the resultant cups less attractive than would be the case were the finish glossy. Cups formed from sheets of crystal polystyrene have a high gloss finish; and, while they are much more attractive than cups formed from high-impact strength polystyrene, they are too brittle to be of practical use. One approach to the problem of providing the desired appearance and performance characteristics is to thermally form the cups from a sheet in which a lamina of axially oriented polystyrene, for example, is applied to a base of high impact strength polystyrene. The lamina provides the desired glossy finish while the base layer provides the desired strength. Vending cups thermally formed from laminated sheets are generally considerably more expensive than cups formed from plain sheets because of the costs involved in fabricating the laminated sheets. Such sheets are conventionally formed by actually laminating one sheet to another subsequent to the extrusion of each sheet, or co-extrusion processes using complex dies and apparatus. Often, it is difficult to convince users that the improved appearance of a product achieved using laminated sheets justified the added cost.

In the cases of other thermally formed products where the cosmetic aspect is dominated by mandatory performance specifications, there may be no alternative to using laminated sheets. Examples of such products are those requiring different colors on opposite sides, those requiring a radiation-stable film on one or both surfaces, or those requiring a chemical resistant film on one or both surfaces. In each of these cases, the expense of laminating sheets with special properties to base sheets can be justified. Obvious advantages are to be derived, however, from reducing the costs of producing laminated sheets from which products are to be thermally formed; and it is the object of the present invention to provide a new and improved method and means by which the desired lamination is achieved during the sheet extrusion process.

BRIEF SUMMARY OF THE INVENTION

Briefly, a thermoplastic sheet comprising a base and a lamina is produced by feeding a heat-plastified laminated rod into a conventional sheet forming die. The laminated rod has a center core of the base material, and a thin outer layer of material having the desired special properties. The outer layer extends less than half-way around the periphery of the cross-section of the core, if the lamina is to be on one side of the sheet only; or, if the lamina is to be on both sides of the base sheet, it is deposited on two discrete layers, each of which extends around the periphery of the cross-section of the core, in effect "sandwiching" the core.

The laminated rod is formed using an adapter extrusion-die interposed between a conventional rod forming extrusion die and the sheet forming extrusion die. The adapter die, by reason of the location and size of its orifice, deposits a layer of heat-plastified lamina material on a portion only of the outer surface of a heat-plastified rod of the base material as the rod is being extruded from the rod-forming die thus establishing the laminated rod. The sheet forming die extrudes the heat-plastified laminated rod into the desired laminated sheet. The peripheral zone of application of the lamina material onto the core is restricted to permit greater uniformity of coating across the finished sheet.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

BRIEF DESCRIPTION OF VIEWS OF THE DRAWING

For a more complete understanding of the nature and objects of the invention, reference should be had to the following detailed description taken in connection with the accompanying drawings wherein:

FIG. 1 is a schematic representation of an extrusion assembly made in accordance with the present invention;

FIG. 2 is a sectional view of the extruder-adapter assembly shown in FIG. 1;

FIG. 3 is a sectional view taken along the lines 3—3 in FIG. 2;

FIG. 4 is a perspective view of one part of the extruder-adapter assembly;

FIG. 5 is a perspective view, partially in section showing the laminated-rod being formed;

FIG. 6 is a schematic modification of the assembly shown in FIG. 1 for producing a three-layer sheet;

FIG. 7 is a further schematic modification for producing a five-layer sheet; and FIG. 8 shows cross-sectional views of modified laminated rods.

DETAILED DESCRIPTION

Referring now to FIG. 1, reference numeral 10 designates, in schematic form, apparatus capable of carrying out the desired lamination during the sheet extrusion process. Apparatus 10 comprises a pair of conventional extruders 11, 12, an extrusion adapter 13, and a sheet extruder 14. Extruder 11, includes the conventional means for producing a rod 15 of heat plastified material at the discharge orifice of an extrusion die mounted at the output end of the extruder.

Extruder 12, in a similar fashion, produces heat-plastified material that is to become the lamina, and furnishes such material via conduit 18 to extrusion adapter 13. The adapter, shown in detail in FIGS. 2, 3 and 4, permits a layer 19 of the material produced by extruder 12 to be deposited on the periphery of rod 15. As shown in FIG. 5, layer 19 covers between 90 and 150 degrees of the periphery of the cross-section of rod 15 as the latter is extruded to establish a heat-plastified laminated rod 20. In any event, the lamina 19 is deposited onto the rod 15 throughout an arc that is less than 180 degrees (in transverse cross-section), although best uniformity of coating of lamina 24 onto base layer 23 has been achieved if the angle of application ("a" in FIGS. 3 and 5) is between 90 and 150 degrees. With this arrangement, a two layer laminated sheet 21 is produced by passing the heat-plastified laminated rod 20 through sheet extrusion die 14. Sheet 21 issuing from orifice 22 in die 14, comprises a base layer 23 of the material of rod 15, and a lamina 24 of the material of layer 19. In a conventional manner, not shown, sheet 21 is cooled and stored.

Referring now to FIGS. 2, 3 and 4 adapter 13 is made up of two elements: Mandrel 25 and housing 26 held together by suitable fasteners (not shown). Mandrel 25 comprises circular flange 27 having cylindrical boss 16 projecting from the downstream face 28 of the flange. The upstream face 29 of flange 27 is provided with a smaller boss 30 which nests in the extrusion cavity of extruder 11. Boss 16, having outer cylindrical surface 17, is provided with an axial bore 31 forming a flow surface for the heat-plastified material furnished by extruder 11 for producing rod 15. Mandrel 25 thus serves the same purpose as, and may replace the usual rod extrusion die on extruder 11 which would normally furnish heat-plastified material to extrusion die 14. On the other hand, by suitably modifying face 29 of the mandrel, the usual die associated with extruder 11 may be retained. In such case, the adapter would be interposed between the usual die of extruder 11 and sheet die 14.

Housing 26 is provided with a counter-sunk recess 32 that has a first portion 33 (FIG. 3) defined by a cylindrical surface matching and engaging surface 17 of boss 16 on the mandrel. Recess 32 also has a second portion defined by inner cylindrical surface 34 spaced from outer cylindrical surface 17 of the boss 16 to establish an arcuate manifold 35 (see FIG. 3). Surface 34 on housing 26 and the portion of surface 17 on boss 16 opposite surface 34 are flow surfaces over which lamina material moves in a heat plastified condition.

Housing 26 is also provided in its upstream face with bore 36 co-axial with and closing matching bore 31 in the boss, for forming a flow surface for heat-plastified material. The down stream face of the housing is provided with hub 37 that mates with a recess (not shown) in the sheet forming die 14 whereby bore 36 is connected to the inlet of die 14.

Orifice means 38 interconnects manifold 35 with bores 31 and 36, so that continuity exists between the flow surfaces defining manifold 35 and the flow surfaces defining the two bores. In the preferred form of the invention, the free end 39 of boss 16 of mandrel 25 is generally conical in shape, and counter sunk recess 32 of housing 26 has a conically shaped bottom 40 that closely matches and mates with the free end of the boss. Orifice mans 38, in such case, is achieved in part by relief portion 41 formed in the free end 39 of boss 16 throughout the arc "a," and in part, by the portion of frusto-conical surface 40 opposite portion 41. Relief portion 41 can be achieved by a milling operation that removes a predetermined amount of metal from mandrel 25. Note that manifold 35 also extends through the arc "a" as seen in FIG. 3 so that the entrance 42 from the manifold to the orifice means, and the exit 43 from the orifice means to the concentric bores, each extend through the same arc. Entrance 42, however, has a cross-sectional flow area larger than the cross-sectional flow area of exit 43 thus achieving a "nozzle" effect on pressurized heat-plastified material contained in manifold 35. In the preferred form of the invention, the cross-sectional area of exit 43 is from about 2½% to about 10% of the cross-sectional area of bores 31, 36 and this spacing between surfaces 40 and 41 of the order of magnitude of 0.040 inches.

As shown in FIGS. 2 and 3, radial bore 44 in housing 26 connects manifold 35 to the exterior of the housing and provides means for passing heat-plastified material from conduit 18 into the manifold. In operation, extruder 11 causes heat-plastified material for the base layer 23 of the finished sheet to be forced into bore 31 (FIG. 2) forming heat-plastified rod 15 as seen in FIG. 5. At the same time, extruder 12 causes heat-plastified material for lamina 24 of the finished sheet to be forced through conduit 18 into manifold 35 forming a partial annular ring of material as seen in FIG. 5. The pressure exerted on the heat-plastified material in manifold 35 forces such material through orifice means 38 where it is deposited in layer 19 on rod 15 at the interface between bores 31 and 36. As seen in FIG. 5, layer 19 extends through the arc "a" about a portion of the periphery of the cross-section of the rod. Because the materials being extruded through bores 31, 36 and through orifice means 38 are in a heat-plastified state, and because the flow of materials is in the laminar region, no intermixing of the materials occurs except at their interface where a true bond is achieved. After passing through sheet die 14, the laminated rod 20 is formed into the desired laminated sheet.

Where it is desired to provide a three-layer sheet as shown in FIG. 6, a modified adapter 13' can be used. The modified adapter has a pair of manifolds rather than one as shown in FIGS. 2, 3 and 4, and a pair of orifice means. In this case, the periphery of rod 15 would have two layers of material deposited thereon, opposite each other across the rod, each of which covers a different arc "a'" and "b'" of the periphery of the cross-section of the rod as shown in FIG. 6. It will be noted that the arcs "a'" and "b'" may be equivalent or may differ one from the other, as desired, but that, taken together will comprise less than 360 degrees of the periphery of the rod. Adapter 13' thus permits both layers to be deposited simultaneously. As described previously, the passage of the laminated rod through the sheeting die produces the desired three-layer sheet.

It is also possible to sequentially deposit the layers on the rod. In such case, two adapters like that shown in FIG. 3 would be connected serially.

Multi-layered sheets can be produced by serially arranging the adapters as shown in FIG. 7. Here, a laminated rod is formed with a pair of laminae producing a five-layered sheet. Other combinations of adapters to provide simultaneous or sequential deposition of layers can be utilized.

While the dies shown in the drawing produce a round rod of heat-plastified material, it is sometimes preferred to produce oval shaped rods that may or may not have flattened or substantially flattened sides, to facilitate the sheeting process. In such case, the major axis would lie in the direction of the width of the sheet as shown in FIG. 8, and, each layer of lamina 19″ or 19‴ will be disposed less than half-way around the core 15″ or 15‴, respectively, and generally of a width "c" less than, or up to the width of "d" of the flattened portions of the oval shaped rods, as illustrated in FIG. 8.

What is claimed is:

1. In a method of extruding a plural layer sheet, the steps which comprise moving a heat plasticized first material through a flow passage having a shape of predetermined cross-section, disposing a layer of a heat plastified second material over only less than 180° of the surface of said first material, whereby a plane may be extended through the edges of said second material and also longitudinally through said first material, and moving the heat plastified combined first and second materials through a coextrusion die, distorting the shape of said combined materials together from their original cross-section and expanding it to that of a wide sheet, which is thinner than said shape, and which sheet extends substantially in said plane.

2. The method of Claim 1, wherein the step of disposing the layer of second material occurs over an arc of between 90 and 150 degrees of the surface of said first material.

3. The method of Claim 2, including the step of disposing a layer of third material over another arc of said first material, also within the arcuate range of 90 to 150 degrees.

4. The method of Claim 1 including the added steps of disposing a layer of heat-plastified third material on the first material prior to the step of passing them through said coextrusion die.

5. The method of Claim 4 wherein said added step occurs subsequently to the step of disposing said layer of second material.

6. The method of Claim 4, wherein said third material is also applied over less than 180° of the surface of said first material.

7. The method of Claim 4 wherein said added step occurs simultaneously with the step of disposing said layer of said second material.

8. The method of Claim 7 wherein said layer of third material is disposed over an opposite portion of the periphery of said first material from the layer of second material, to comprise an aggregate disposition over less than all of the periphery of the first material.

9. The method of Claim 1, wherein the initially extruded first material is of oval periphery having substantially flattened side portions, connected by arcuate portions, and wherein the layer is disposed on at least one substantially flattened side portion.

10. The method of Claim 9, wherein similar layers are disposed on both substantially flattened side portions.

11. The method of Claim 9, wherein the layer is disposed over less than all of the substantially flattened side portion.

References Cited

UNITED STATES PATENTS

| 3,423,498 | 1/1969 | Lefevre | 425—131 |
| 3,288,895 | 11/1966 | Windeler | 264—174 |
| 2,900,708 | 8/1959 | Pond | 425—131 |
| 2,945,265 | 7/1960 | Sell et al. | 264—176 R |

ROBERT F. WHITE, Primary Examiner
W. E. HOAG, Assistant Examiner

U.S. Cl. X.R.

264—177